Patented Feb. 17, 1931

1,792,780

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.   Application filed October 17, 1927.   Serial No. 226,814.

My invention relates to the vulcanization of rubber and it has, for its primary object, the provision of desirable material for accelerating the vulcanization of rubber products.

More specifically, my invention has for one of its objects the provision of an accelerator which is composed of a mercaptoxazole or a derivative thereof.

Recently it has been observed that certain mercaptans, particularly the mercaptothiazoles, have powerful accelerating effects upon the rate of vulcanization when incorporated in a rubber compound. Among the mercaptothiazoles which have been found useful for this purpose are mercaptobenzothiazoles and various derivatives and homologues thereof, such as those containing chlorine and nitrogen groups substituted in the aryl ring. It has also been observed that powerful accelerators are obtained by substituting certain substances, particularly those of a basic nature, into the mercapto group. The reaction products of mercaptobenzothiazole and zinc salts may be mentioned as one example of such compounds. Another example is the reaction product obtained from mercaptobenzothiazole and amines, such as diphenylguanidine and diethylamine.

I have made the discovery that the mercaptoxazoles which are quite similar in structure to the mercaptothiazoles, except for the replacement of the sulphur of the thiazole ring by an oxygen atom, may also be incorporated into rubber compounds to produce powerful accelerators. The derivatives of the benzoxazoles and the amines are particularly valuable for this purpose. Among the compounds which may be so employed are the reaction products of mercaptobenzoxazole and diphenylguanidine.

One method which may be employed in preparing this product is described as follows:

Dissolve 15.1 grams of mercaptobenzoxazole in about 50 cc. of hot alcohol and to this solution add 21 grams of diphenylguanidine dissolved in 50 cc. of alcohol. When this mixture is allowed to cool for a short time, crystals separate out, which are then filtered and dried. It is found that these crystals have a definite melting point of about 169° or 170° C., indicating that they are true compounds formed by the chemical interaction of the mercaptobenzoxazole and the diphenylguanidine.

The chemical reaction of these materials may be represented by the following structural equation:

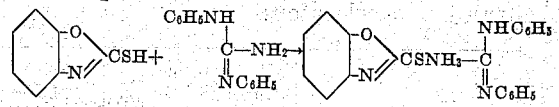

The reaction product of mercaptonaphtoxazole and diphenylguanidine has also been found to be a good accelerator.

The mercaptonaphtoxazole may be prepared by the following method:

β-naphthol is treated with nitrous acid to form a nitroso derivative. This substance is then treated with sodium hydrosulphide and carbon bisulphide, and mercaptonaphtoxazole is produced. The reactions taking place may be represented according to the following chemical formula:

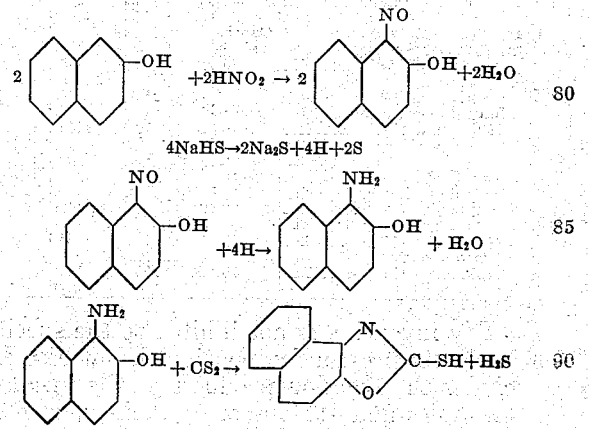

This substance is then dissolved in hot alcohol and intermixed with a solution of diphenylguanidine in alcohol in a manner similar to that described in connection with the process for preparing the reaction product of mercaptobenzoxazole and diphenylguanidine.

The reaction products of mercaptobenzoxazole and mercaptonaphtoxazole with various amines other than diphenylguanidine may be prepared by the methods just discussed. For example, diethylamine reacts with both mercaptobenzoxazole and mercaptonaphtoxazole to produce very efficient accelerators. The first mentioned material is an oil and the latter is a crystalline substance having a melting point ranging from 125° C. to 127° C.

The accelerators may be incorporated in rubber compounds composed of various ingredients in varying proportions. The following is an example of a formula which insures excellent results:

| | Parts |
|---|---|
| Pale crepe rubber acetone extracted | 100 |
| Zinc oxide | 5 |
| Sulphur | 3 |
| Stearic acid | 1.5 |
| Accelerator (mercaptoxazole or derivative) | ½ to 1 |

The appended table contains the data obtained by testing a number of samples containing various oxazoles and derivatives thereof as accelerators.

| | Time in minutes | Modulus kgs/cm.² | | Tensile strength | Per cent elongation |
|---|---|---|---|---|---|
| | | 500 | 700 | | |
| (1) Mercaptobenzoxazole used 1% | *Cure at 40#* 30 | 5.5 | 9 | 33 | 990 |
| | 60 | 10 | 26 | 81 | 960 |
| (2) Mercaptobenzoxazole diphenylguanidine ½% of compound used | 30 | 36 | 157 | 215 | 755 |
| | 60 | 36 | 155 | 225 | 765 |
| | 90 | 22 | 127 | 225 | 795 |
| (3) Mercaptonaphtoxazole used 1% | 30 | 18 | 54 | 110 | 820 |
| | 60 | 22 | 70 | 160 | 840 |
| | 90 | 24 | 74 | 150 | 820 |
| (4) Mercaptonaphtoxazole diphenylguanidine ½% of crude compound used | 15 | 23 | 87 | 144 | 790 |
| | 30 | 34 | 138 | 195 | 760 |
| | 45 | 40 | 163 | 210 | 745 |
| Mercaptonaphtoxazole diethylamine (½%) | *Cure at 20#* 30 | 21 | 80 | 135 | 765 |
| Mercaptonaphtoxazole diethylamine (½%) | 60 | 38 | 154 | 204 | 750 |
| Mercaptobenzoxazole diethylamine (½%) | 20 | 21 | 70 | 140 | 825 |
| Mercaptonaphtoxazole diethylamine (½%) | *Cure at 40#* 30 | 19 | 60 | 140 | 855 |
| Mercaptonaphtoxazole diethylamine (½%) | 50 | 20 | 73 | 155 | 835 |
| Mercaptobenzoxazole diethylamine (½%) | 70 | 23 | 80 | 150 | 800 |

My invention is not limited to the specific products previously mentioned, but also includes the reaction products of the mercaptoxazoles and various other amines, such as butylamine, and benzylamine, all of which react with the mercaptan group of the oxazole ring to form addition products.

Although I have disclosed but the preferred embodiments of my invention and described those embodiments in detail, it will be apparent to those skilled in the art that it is not so limited but that various minor modifications and changes may be made therein without departing from the spirit of my invention or from the scope of the appended claims.

What I claim is:

1. A method of vulcanizing rubber which comprises heating a mixture containing rubber, sulfur and the reaction product of mercaptobenzoxazole and a basic amine capable of reacting therewith, said product being an accelerator of vulcanization.

2. A method of vulcanizing rubber which comprises heating a mixture containing rubber, sulfur and the reaction product of mercaptobenzoxazole and a basic secondary amine, said product being an accelerator of vulcanization.

3. A method of vulcanizing rubber which comprises heating a mixture containing rubber, sulfur and the reaction product of mercaptobenzoxazole and a basic aromatic amine, said product being an accelerator of vulcanization.

4. A method of vulcanizing rubber which comprises heating a mixture containing rubber, sulfur and the reaction product of mercaptobenzoxazole and diphenylguanidine.

5. A method of accelerating the vulcanization of rubber which comprises incorporating therein a material having the following formula:

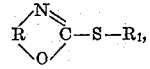

in which R is an aryl radical selected from a group comprising benzene and naphthalene containing not more than ten carbon atoms and $R_1$ is an aryl radical resulting from the interaction of a basic amine and the mercaptan group.

6. A method of accelerating the vulcanization of rubber which comprises heating it in the presence of a material having the following formula:

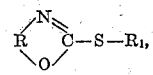

in which R is a benzene group and $R_1$ is a basic amine residue.

7. A method of accelerating the vulcanization of rubber which comprises heating it in the presence of a material having the following formula:

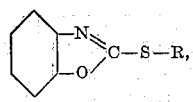

in which R is a basic amine residue.

8. A method of accelerating the rate of vulcanization of rubber which comprises heating it in the presence of a material having the following formula:

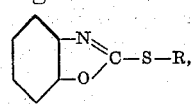

in which R is the residue of a basic secondary amine.

9. A method of accelerating the rate of vulcanization of rubber which comprises heating it in the presence of a material having the following formula:

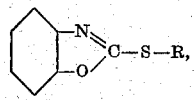

in which R is a dibenzene substituted guanidine.

In witness whereof, I have hereunto signed my name.

Signed at Akron, in the county of Summit, and State of Ohio, this 12th day of October, 1927.

JAN TEPPEMA.